Dec. 4, 1928.

E. A. SPERRY 1,693,966

OIL BURNING ENGINE

Filed Sept. 26, 1919   3 Sheets-Sheet 1

INVENTOR
ELMER A. SPERRY.
BY
Herbert H. Thompson
HIS ATTORNEY

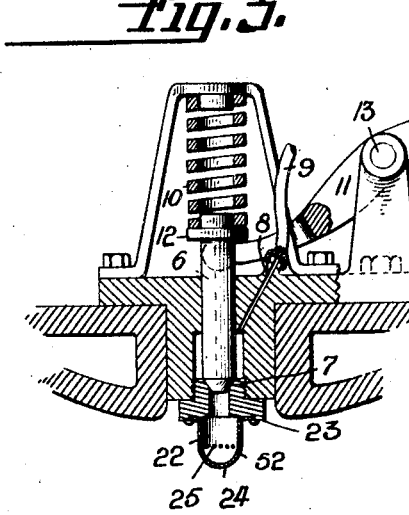
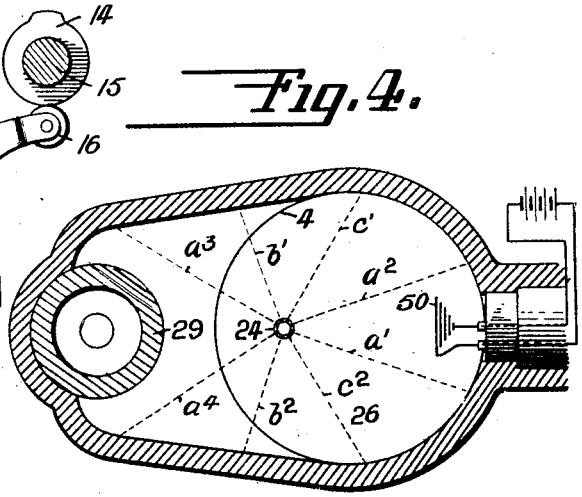
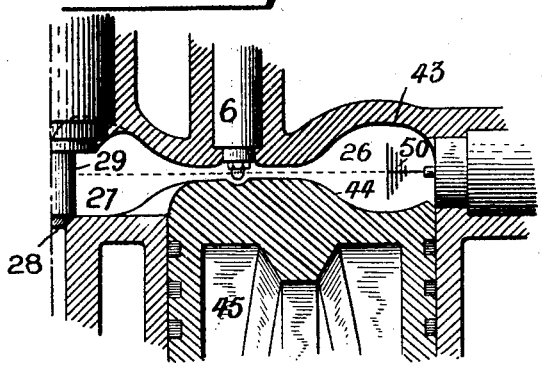
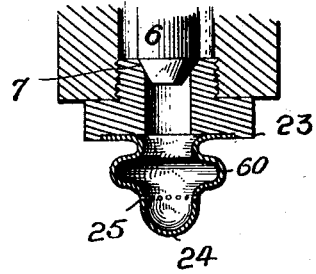
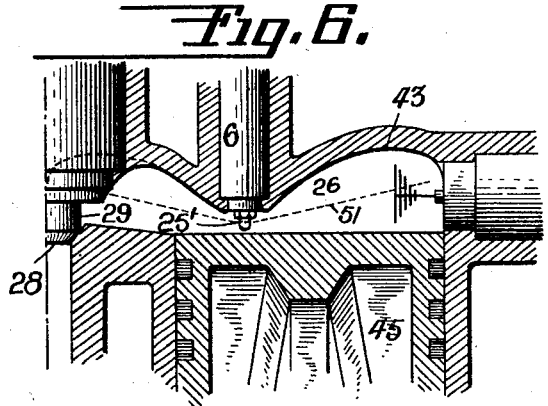
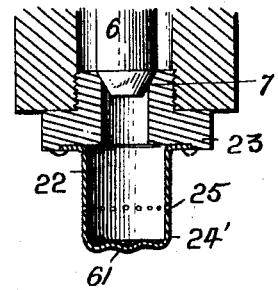

Dec. 4, 1928.
E. A. SPERRY
1,693,966
OIL BURNING ENGINE
Filed Sept. 26, 1919   3 Sheets-Sheet 3
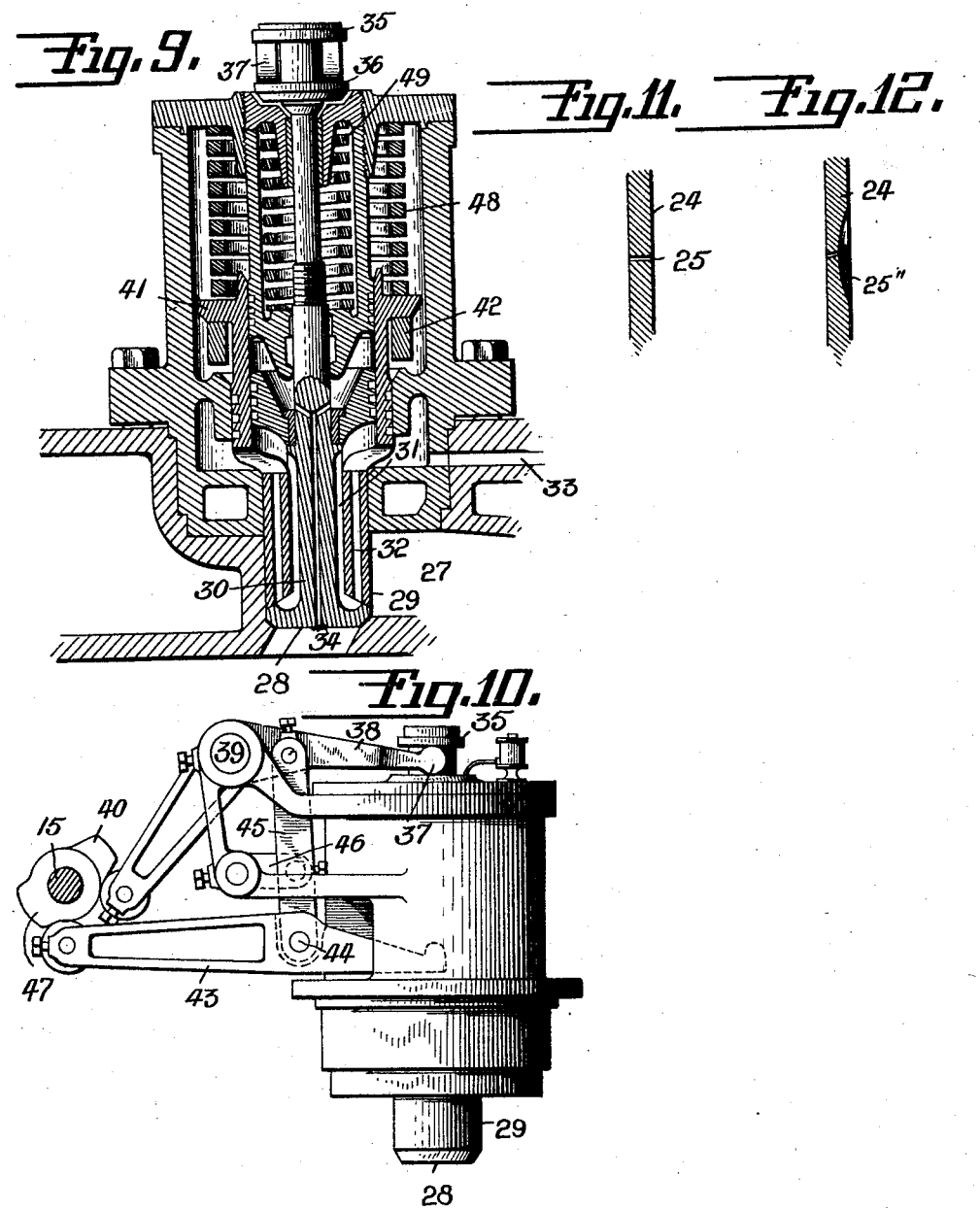
INVENTOR
ELMER A. SPERRY.
BY
Herbert H. Thompson
HIS ATTORNEY.

Patented Dec. 4, 1928.

1,693,966

UNITED STATES PATENT OFFICE.

ELMER A. SPERRY, OF BROOKLYN, NEW YORK, ASSIGNOR TO SPERRY DEVELOPMENT COMPANY, OF DOVER GREEN, DELAWARE, A CORPORATION OF DELAWARE.

OIL-BURNING ENGINE.

Application filed September 26, 1919. Serial No. 326,654.

This invention relates to internal combustion engines of the Diesel or oil burning type. The invention especially relates to fuel injecting means for such engines and comprises an improved injecting means and an improved combustion or mixing chamber therefor whereby the oil may be injected into the cylinder in a solid jet and at the same time a complete mixture of the fuel with the air in the combustion space obtained thereby securing the highest efficiency in an engine of this type.

By means of exhaustive experiments I have determined the exact form assumed by a jet of oil discharged under the conditions present in a combustion cylinder and have designed a fuel nozzle and combustion space so that the fuel will reach practically instantly upon its discharge from the nozzle all parts of the combustion space, and in the form of a fog or mist, while at the same time a minimum amount impinges or condenses upon the walls of the cylinder or the piston head. While my invention is equally well adapted for both simple and multiple expansion engines I have shown the same in connection with a four cycle compound engine to which my invention has especial adaptation and wherein a combustion cylinder is symmetrically placed on each side of an expansion cylinder and alternately exhausted into the same. The engine is preferably of the general type disclosed in my copending application Serial No. 181,204, filed July 18, 1917 in which a large clearance is employed in the combustion cylinder and the intake air is precompressed prior to its entry to the cylinder where further compression is effected on the usual compression stroke.

Referring to the drawings in which what I now consider the preferred form of my invention is shown:

Fig. 3 is a vertical section of one of the oil injection valves.

Fig. 4 is a horizontal section taken on line 4—4 of Fig. 1.

Fig. 5 is a section view showing a slight modification in the shape of the clearance or combustion space.

Fig. 6 is a similar view of a further modification.

Fig. 7 is a sectional detail of a modified form of injection valve.

Fig. 8 is a similar view of a third modification.

Fig. 9 is a vertical section of one of the combined induction and transfer valves shown in Fig. 1.

Fig. 10 is a side view of one of said valves showing the mechanism to operate the same.

Figs. 11 and 12 are details of two forms of nozzles used to supply the oil jets.

Figure 1:
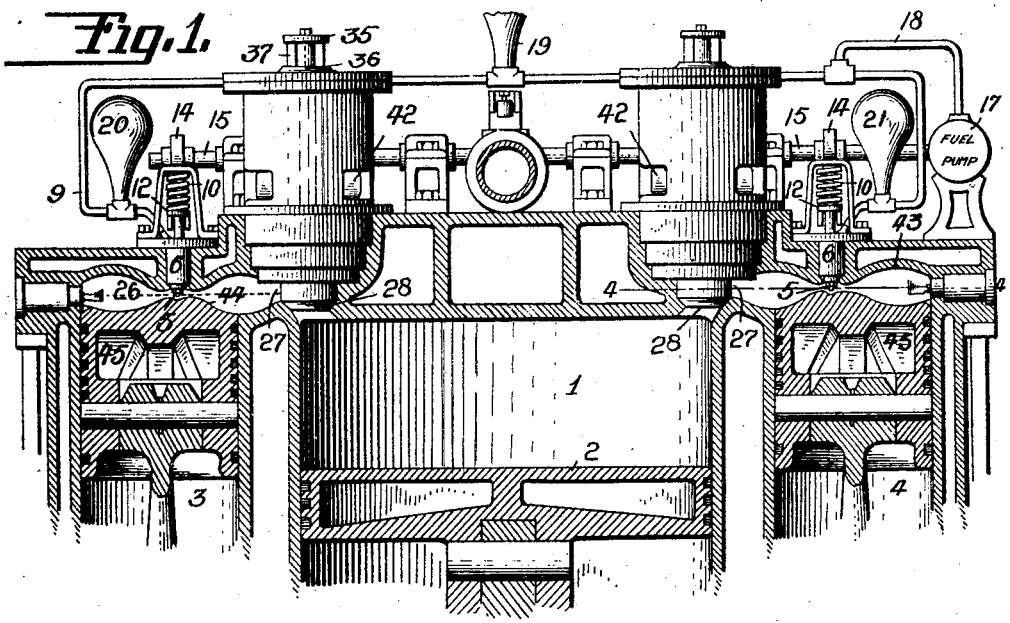
Fig. 1 is a vertical section through the compound engine constructed according to my invention.

As stated, my invention is shown as applied to a compound internal combustion engine comprising a central expansion cylinder 1 and piston 2 and a pair of combustion cylinders 3 and 4 placed on opposite sides of said expansion cylinder. At the explosion end of each combustion cylinder is located a fuel valve 5. Said valve is of special construction and is adapted to inject fuel oil into the cylinder periodically at very high pressure and without the employment of compressed air. The fuel valve as shown comprises a valve proper 6 seated upon the valve seat 7 to which oil is supplied at high pressure through the channel 8 to which pipe 9 is connected. The valve is normally held on its seat by a stiff spring 10 and may be periodically lifted at the proper time in the cycle by any suitable means such as a lever 11 bearing against the collar 12 on the valve and pivoted at 13. A cam 14 on a cam shaft 15 serves to operate the lever by striking the free end 16 in a well-known manner.

The fuel oil is supplied under very high pressure by means such as a pump 17 operated in any desired manner, not shown, from cam shaft 15. From the pump the oil is led through pipe 18 to the transversely extending pipe 9 connected to the valve on each combustion cylinder. In said line is provided at least one air chamber 19 by means of which the high pressure of the fuel is maintained when either valve opens. The chamber 19 is shown as connected in the pipe line 9 between the two valves 5 and 5' and spaced from each. In addition to or instead of chamber 19 there may be provided a pair of chambers 20 and 21, one located adjacent each valve so that the high pressure may be maintained immediately adjacent each valve. Below the valve and valve seat is an oil chamber 22 formed by member 23, constituting the valve seat, and the cap 24 forming the nozzle portion of the valve. In said cap are a plurality of laterally positioned orifices 25 designed to extrude the oil transversely of the combustion cylinder and the clearance space 26.

A passage 27 connects each combustion cylinder with the expansion cylinder, said passage being formed for the most part by the clearance space 26 in the combustion cylinder. Said passage is closed adjacent the expansion cylinder by means of the transfer valve 28. Juxtaposed to said valve and preferably forming a part thereof is an intake or induction valve 29 shown as formed as a sleeve surrounding the stem 30 of the transfer valve, the details of which form no part of the present invention but are hereinafter briefly stated.

Figure 2:
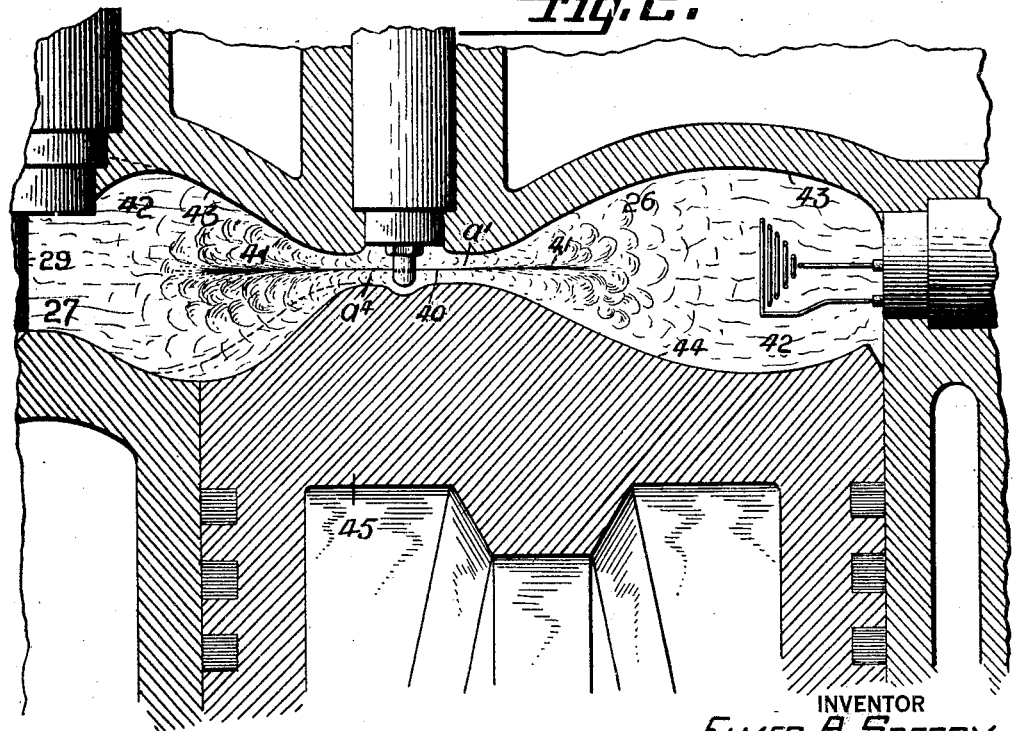
Fig. 2 is an enlarged vertical section through one of the combustion cylinders.

As hereinbefore stated the pressure of the oil used, the size and location of the orifices, and the contour of the combined clearance and transfer space in the combustion cylinder are so designed as to furnish a complete mixture of finely divided oil and air filling the said space completely but without wetting the perimeter thereof. By exhaustive experiments I have determined that a jet of oil when discharged through a suitable orifice at high predetermined pressure possesses certain definite characteristics when discharged into gases having a predetermined pressure and of requisite volume such as is secured in the precompressed gases in the combustion cylinder of a compound engine constructed according to my invention. The pressure of discharge, the character of the orifice, and the pressure encountered by the jet must all be properly adjusted and coordinated to secure the desired result. A typical example of such a jet is shown in Fig. 2 representing roughly the behavior of the jet when discharged under what may be considered as high pressures, say from 180 to 360 atmospheres, through an orifice, say 5 to 15 thousandths of an inch, generally capillary as to the fuel employed and substantially more than one diameter long into air of from 400 to 600 pounds pressure per square inch. It will be noted that the oil leaves the orifice in a solid stream 40 beyond which it feathers into a "spray" 41. Still further from the nozzle the spray seems to vaporize into a mist or fog 42 which spreads outwardly so that the whole jet seems to assume a pear shaped form. On increase of pressure the feathering is found to take place closer and closer to the nozzle until at very high pressures the solid portion of the jet almost vanishes and may be considered as substantially confined to the nozzle itself. As stated, the behavior is also dependent upon the pressure and to a limited extent upon the volume of the gases into which the jet is discharged, the characteristics under high pressure such as I employ in an engine of this character, being different from the behavior at atmospheric pressure. In my compound engine high efficiency is obtained (1) by the employment of a very large clearance space in the combustion cylinder and (2) by employing a high precompression pressure. The latter is attained by precompressing the intake air for the combustion cylinder followed by a further compression with said cylinder. This large clearance space lends itself admirably to the employment of jets of the character described, since a too limited space would prevent or seriously interfere with the formation of the complete jet; while the high pressure of the gases stabilizes the jet structure.

In order to obtain the most complete mixture possible I have designed this clearance space in the combustion cylinder with reference to the observed shape of the jets at the pressure desired to be used or employ a shape as will best accommodate such jets, having due regard for the mechanical features of the design. Thus, as shown in Fig. 2, the outer wall 43 of the cylinder is convex in shape so that a minimum transverse area is provided immediately adjacent the nozzle, said area increasing in accordance with the size and shape of the jet. The top 44 of the piston 45 may also be designed to cooperate with the cylinder walls in furnishing a suitable mixing space. To this end I have shown the top 44 of the piston as of a convex shape whereby the space adjacent the nozzle is a minimum, such space gradually increasing symmetrically on both sides of the center line of the combustion space and jet. Instead of employing only one orifice, however, I prefer to employ a plurality of orifices which discharge in many or opposite directions so that the valve may be more or less centrally located and extrude the jets in a plurality of directions substantially radially of the cylinder. The jet $a_4$, therefore, shown in Fig. 2 extends oppositely to jet $a_1$ and toward the induction valve 29.

The combined clearance space and transfer space 26 and 27 is of similar design to the space on the opposite side of the valve and for this purpose the valve may be eccentrically located with respect to the center line of the cylinder. The approximate shape of the clearance space in plan may be obtained by reference to Fig. 4. In this figure the top of the combustion cylinder is represented at 4 while the nozzle is shown at 24 and the induction sleeve valve at 29. The clearance space it will be seen in vertical section is somewhat in the shape of a dumbbell or an hour-glass, while as a whole it is like a disc auto wheel having a large pneumatic tire, but having a more or less elliptical perimeter. In this embodiment eight orifices $a^1$, $a^2$, $a^3$, $a^4$, $b^1$, $b^2$, $c^1$, $c^2$ are used which are positioned to give the best distribution of oil. The nozzle 24 is so positioned that the distances of all the orifices lettered $a$ from the walls of the clearance space are equal; that the distances of the two orifices lettered $b$ from the walls are equal; and that the distances of the two orifices lettered $c$ are likewise equal. The orifices $a^3$, $a^4$ direct the oil so as to straddle the sleeve valve 29 since said valve is closed at the time the fuel is extruded. The fresh air around the valve is thus thoroughly mixed.

Another characteristic of the jets is that the smaller the orifice the closer to the nozzle the feathering takes place. Therefore, I prefer to make the orifices lettered $a$ of the same size and larger than either of the two groups of orifices lettered $b$ and $c$ since the orifices $a$ are a greater distance from the walls than the other two. Similarly the orifices $c$ are preferably made larger than the orifices $b$, being slightly further from the cylinder walls.

For igniting the mixture I may employ an electrically heated coil 50 situated in the cylinder wall and projecting laterally into the clearance space. The heating of said coil is preferably automatically controlled in accordance with the requirements of the engine as disclosed in my copending application, Serial No. 312,193, for "valve mechanism for internal combustion engines."

In Fig. 5 is shown how the shape of the combustion space may be varied to suit the different pressures of oil used and other variable conditions such as the varying conditions of oil, or size of the orifices, or pressure of air used within the cylinder. Fig. 5 for instance shows a clearance space for a jet having a longer solid portion than that shown in Fig. 2. The walls of the clearance space extend, therefore, for a greater distance from the center before spreading outwardly to form the larger clearance space.

Figs. 6 and 12 show a still further modification which avoids the use of the convex top piston. According to this modification the variations in volume of the jet is taken care of by the curvature of the outer wall 43 of the combustion cylinder in combination with orifices 25' (see Fig. 12) which are inclined slightly upwardly so that the jets are discharged approximately along the center line 51 of the combustion space as in the preferred form. While the orifices vary in size all of them are preferably small and long enough so that the capillarity or viscosity of the oil will prevent discharge of the oil therethrough when the valve 6 is closed thereby allowing the chamber 22 to remain filled. Said chamber may be designed to hold approximately the charge required for one cycle of the engine (see Figs. 11 and 12). Preferably also the walls 52 of the cap 24 are thicker than the diameter of the jets so that the wall of each orifice 25 is at least twice the length of the diameter for the purpose of giving the jet the proper characteristics and to introduce the proper amount of skin friction and shear into the jet for the important objects detailed herein. (Fig. 11.) If the length of the orifice is too great the walls 24' may be cut away around the orifice 25'', as shown in Fig. 12. Also the walls of the cap may be made more or less resilient if desired to avoid shocks. One method of accomplishing this purpose is shown in Fig. 7 where cap 24 is formed with a bulging portion 60 whereby the walls are made more or less resilient. Another method of accomplishing this purpose is shown in Fig. 8 wherein the bottom 61 of the cap 24' is corrugated for the same purpose.

A preferred construction for combined transfer and intake valve is shown in Figs. 9 and 10. In these figures the valves are shown as concentrically mounted with the intake valve comprising a sleeve 29 surrounding the stem 30 of the transfer valve 28 as stated above. The intake air coming in through passage 33 flows down through openings 32 in the sleeve valve and through channels 31 in the stem 30 and out between the top of the transfer valve 28 and the sleeve valve when the latter is lifted. The stem 30 may be provided with a small bore 34 to equalize pressures on the valve. The stem extends upwardly and may be provided at its outer end with collars 35 and 36 between which the forks 37 of an actuating lever 38 take. Said lever is pivoted at 39 and is operated from the cam shaft 15 by cam 40. The intake or sleeve valve extends upwardly and is provided with an annular extension 41 against which the forks 42 and of a second lever 43 bear. Said lever is pivoted at 44 on the link 45 connected preferably to lever 38 and also to a short link 46. Said lever is operated from said cam shaft 15 by the cam 47. A heavy spring 48 serves to hold both valves on their seats, while a spring 49 holds the transfer valve on its seat when the intake valve is raised, as will be readily apparent.

In accordance with the provision of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a combustion engine, the combination with the combustion cylinder, of a clearance space at the end of the same having an hour-glass or dumb-bell section the lobes of which have a longer and a shorter axis and with its longer axis at a substantial angle to the axis of the cylinder and means for extruding fuel in the form of a jet directly along the axis of said section.

2. In a combustion engine of the Diesel type, a combustion cylinder having a convex end, a fuel valve located adjacent the apex of said end having a plurality of orifices adapted to direct the liquid fuel unmixed with air transversely of the cylinder in a plurality of directions and means for maintaining said liquid fuel under high pressure.

3. A combustion engine as claimed in claim 2 in which the size of the orifices varies in accordance with the distance of the cylinder wall from each orifice.

4. In a fuel oil engine, the combination with a cylinder and piston having a clearance space at one end thereof, an intake valve located to one side of said end, a fuel injection valve having an orifice adapted to discharge liquid fuel unmixed with air in the general direction of said intake valve and means for maintaining the oil under sufficient pressure to cause it to break into a mist or fog upon injection into cylinder.

5. In a fuel oil engine, the combination with a cylinder and piston having a clearance space at one end thereof, an intake sleeve valve located to one side of said end, and extending across said space and a fuel injection valve having a plurality of orifices adapted to discharge liquid fuel to each side of said intake valve.

6. In a combustion engine, the combination with the cylinder having a combustion chamber and an induction valve, a passage connecting said valve and cylinder forming a part of said chamber, and a fuel nozzle located at a distance from said valve having an orifice adapted to direct fuel transversely along said passage in the general direction of said valve.

7. In a combustion engine, the combination with the cylinder having a combustion chamber and an induction sleeve valve, a passage connecting said valve and cylinder forming a part of said chamber, said valve being at the far end of said passage and a fuel nozzle located at a distance from said valve having orifices adapted to direct fuel along said passage to either side of said valve.

8. In a compound combustion engine having a combustion and an expansion cylinder located side by side, the former having an elongated clearance space overlying the same and the adjacent side of expansion cylinder, a transfer valve leading into said expansion cylinder from said space and a remotely located fuel injection device adapted to project the fuel toward said valve transversely of the cylinder.

9. In a combustion engine having a compound combustion cylinder and piston, said cylinder having a combustion space above the piston extending transversely beyond the piston on the side adjacent the expansion cylinder, a fuel valve and adapted to project liquid fuel fuel unmixed with air and centrally located with respect to said space but eccentrically located with respect to the cylinder bore and means for maintaining said fuel under high pressure.

10. In a combustion engine having a compound combustion cylinder and piston, said cylinder having a combustion space above the piston extending transversely beyond the piston on the side adjacent the expansion cylinder, an intake valve located at such side, a fuel valve and adapted to project liquid fuel unmixed with air and centrally located with respect to said space but eccentrically located with respect to the cylinder bore.

11. In a compound combustion engine having high and low pressure cylinders, the former having an elongated combustion space extending toward the latter, a transfer valve and an intake valve at the end of said space adjacent said low pressure cylinder and a fuel valve centrally located in said space and adapted to project liquid fuel in a plurality of transverse directions.

12. In a combustion engine of the Diesel type, the combination with a combustion cylinder having a clearance space at the end of the same, of a fuel nozzle for directing a plurality of jets into said space, the walls of said cylinder being so formed that said clearance space has substantially the shape of the jets when vaporized under predetermined pressure conditions, the walls of said clearance space being at varying distances from said nozzles, and means whereby the lengths of said jets are made to correspond to the distances between the walls of said clearance space and said nozzle.

13. In a combustion engine of the Diesel type, the combination with a combustion cylinder and a piston operating in said cylinder, there being a clearance space formed between said cylinder and the end of said piston, of a fuel nozzle for directing a plurality of jets into said space, the walls of said cylinder and the end of said piston being so formed that said space has substantially the shape of the jets when vaporized under predetermined pressure conditions, the walls of said clearance space being at varying distances from said nozzle, and means whereby the lengths of said jets are made to correspond to the distances between the walls of said clearance space and said nozzle.

14. An oil engine of the type in which liquid fuel is ignited through contact with heated compressed air, comprising a cylinder, a piston sliding within the cylinder, the opposing faces of the cylinder head and piston both being shaped to cooperate in forming a combustion chamber when the piston is substantially at the top of its stroke having an outer annular portion of substantial depth, an inner central portion of restricted depth and substantially less in depth than the outer portion and communicating therewith through a portion flaring outwardly, and oil spraying means located at the central restricted portion of the combustion chamber and designed to spray oil in a radial direction directly to the hot core of air in the outer annular portion of the combustion chamber without cooling by contact with the piston or cylinder walls.

15. An oil engine of the type in which liquid fuel is ignited through contact with heated compressed air, comprising a cylinder, a piston sliding within the cylinder, the opposing faces of the cylinder head and piston both being shaped to cooperate in forming a combustion chamber when the piston is substantially at the top of its stroke having an outer annular portion with a depth approximating one-quarter the diameter of the combustion chamber, an inner central portion of substantially less depth than the outer annular portion and communicating therewith through a portion flaring outwardly, and oil spraying means located at the central restricted portion of the combustion chamber and designed to spray oil in a radial direction directly to the hot core of compressed air located in the annular portion of the chamber without cooling by contact with the piston or cylinder walls.

In testimony whereof I have affixed my signature.

ELMER A. SPERRY.